(12) United States Patent
Baumert et al.

(10) Patent No.: US 7,571,328 B2
(45) Date of Patent: Aug. 4, 2009

(54) SYSTEM AND METHOD FOR DISTRIBUTING DIGITAL CONTENT OVER A NETWORK

(75) Inventors: David W. Baumert, Sammamish, WA (US); Flora P. Goldthwaite, Seattle, WA (US); Gregory L. Hendrickson, Seattle, WA (US); Jonathan C. Cluts, Sammamish, WA (US); Pamela J. Heath, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1 day.

(21) Appl. No.: 11/048,208

(22) Filed: Feb. 1, 2005

(65) Prior Publication Data

US 2006/0173789 A1 Aug. 3, 2006

(51) Int. Cl.
*G06F 1/24* (2006.01)
(52) U.S. Cl. .............. 713/192; 713/125; 713/168; 380/278
(58) Field of Classification Search .......... 713/192, 713/168; 725/87
See application file for complete search history.

(56) References Cited

U.S. PATENT DOCUMENTS

| | | | |
|---|---|---|---|
| 5,892,902 A | 4/1999 | Clark | 395/187.01 |
| 5,933,498 A | 8/1999 | Schneck et al. | 380/4 |
| 5,943,423 A | 8/1999 | Muftic | 380/25 |
| 5,979,773 A | 11/1999 | Findley, Jr. et al. | 235/492 |
| 6,003,135 A | 12/1999 | Bialick et al. | 713/201 |
| 6,564,259 B1 | 5/2003 | Baber et al. | 709/223 |
| 6,779,115 B1* | 8/2004 | Naim | 713/192 |
| 2002/0161476 A1* | 10/2002 | Panofsky et al. | 700/231 |
| 2003/0229900 A1* | 12/2003 | Reisman | 725/87 |
| 2004/0230797 A1* | 11/2004 | Ofek et al. | 713/168 |
| 2005/0091338 A1* | 4/2005 | de la Huerga | 709/217 |
| 2005/0198510 A1* | 9/2005 | Robert et al. | 713/175 |

OTHER PUBLICATIONS

WebStickers: Using Physical Tokens to Access, Manage and Share Bookmarks to the Web; authored by Peter Ljunstrand, John Redstrom and Lars Erik Holmquist; printed Apr. 2000.
Digital Rights Management for the Online Music Business; authored by Sai Ho Kwok, printed Jun. 2002.
Informative Things: How to attach information to the real world; authored by Rob Barrett and Paul P. Maglio; In proceedings of UIST'98. ACM Press. (1998).
Virtual Extension: Authentication in e-commerce; authored by Amit Basu, Steve Muylle; printed Dec. 2003.

* cited by examiner

*Primary Examiner*—Evens J Augustin
(74) *Attorney, Agent, or Firm*—Shook, Hardy & Bacon LLP

(57) ABSTRACT

A system and method for distributing digital content over a computer network. A set of digital content is provided in a storage location that is accessible by the network. One or more physical tokens store data related to accessing the set of digital content. When a token is at a remote location, a request for the set of digital content to be presented at the remote location is received. In response to this request, presentation of the digital content is allowed at the remote location.

20 Claims, 7 Drawing Sheets

SYSTEM AND METHOD FOR DISTRIBUTING DIGITAL CONTENT OVER A NETWORK

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

The present invention relates to the distribution of digital content. More particularly, the present invention provides systems and methods for distributing digital content over a computer network.

BACKGROUND OF THE INVENTION

As the world enters the digital information age, use of computers is at an all time high, and the rise in the popularity and usage of computer networks such as the Internet has exceeded even the most optimistic view of many computer developers. This increased usage of computers and the Internet has encouraged the development and growth of systems of e-commerce which allows consumers to now shop, bank, book travel, etc. from the comfort of their own home via the Internet. However, because computer networks were designed for the transfer of digital content, they are unable to deliver the physical products purchased online through e-commerce. In fact, often e-commerce systems do not offer a physical product at all. While physical products still require elements of traditional commerce, "information" products, such as digital content, may fully exploit the medium of the Internet to allow for a total e-commerce selection, purchase, and delivery, all without any physical objects exchanging between the customer and seller.

Despite the convenience of purchasing products such as software or audio files over the Internet, many content providers and consumers still appreciate having a physical representation of the digital content. Consumers may place a psychological value in owning a tangible representation of their digital content. For example, even with the advent of e-commerce, contemporary music is still sold on compact discs (CDs). Consumers often decide to purchase a CD, despite the advantages of downloading the music over the Internet, because music fans take pride in their music collections, enjoy trading discs, and like being able to transport their music on this tangible media.

Content providers also may find it advantageous to associate a physical object with the sale of digital content. Returning to the CD example, in purchasing a CD, the consumer is simply buying a license to play the digital content—the discs themselves provide only a physical embodiment of the rights under the license, and the license is bound to the physical disk. Further, because sales of the music are tied to physical units, it is easier for retailers to track consumers and sales.

While distribution of digital content on physical media such as a CD may have advantages, providing content over a network or the Internet has its upside as well. For example, the provided content may be periodically updated or changed. By utilizing the Internet to distribute the content, customers will always receive the most recent material without purchasing additional physical media. Also, a wider variety of content may be provided over the Internet, or a vender may have greater flexibility in offering customized sets of digital content. Lastly, a purely digital system may allow for greater security against unauthorized use. For example, if the content provider is contacted each time the media is accessed, the provider can monitor any utilization of their media.

Considering the foregoing, there are numerous advantages to both the distribution of digital content on physical media and to providing content over a network or the Internet. However, existing e-commerce systems are not able to leverage the advantages of utilizing physical objects with the distribution of digital content. Accordingly, there is a need for an improved system and method which utilizes physical objects in the distribution of digital content over the Internet or a network.

SUMMARY OF THE INVENTION

The present invention meets the above needs and overcomes one or more deficiencies in the prior art by providing a computer-implemented method for distributing digital content over a computer network. A set of digital content is provided in a storage location that is accessible by the network. The method also provides physical tokens that store data related to accessing the set of digital content. When a token is at a remote location, a request for the set of digital content to be presented at the remote location is received. In response to this request, presentation of the digital content is allowed at the remote location.

Another aspect of the present invention provides a computer system for distributing digital content over a computer network. The system includes digital content residing in a storage location accessible by one or more computers connected to a computer network. Physical tokens are included in the system. These tokens store data related to the set of digital content, including a reference to the content. A token reader device is configured to read the data from the tokens, and a content access device utilizes this data to determine whether a presentation device should be permitted to present the digital content.

A further aspect of the present invention provides a computer system for managing access to digital content. One or more physical tokens are included, and the tokens store data related to access rights to digital content. The system includes a token reader device that utilizes the data from the tokens to generate a request for the content be presented at a remote location. An interface device is capable of transmitting this request. When the request is granted, a presentation device renders at least a portion of the digital content.

BRIEF DESCRIPTION OF THE SEVERAL VIEWS OF THE DRAWINGS

The present invention is described in detail below with reference to the attached drawing figures, wherein.

DETAILED DESCRIPTION OF THE INVENTION

The subject matter of the present invention is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described. Further, the present invention is described in detail below with reference to the attached drawing figures, which are incorporated in their entirety by reference herein and wherein.

The present invention provides an improved system and method for distributing digital content to authorized recipients. The invention may be described in the general context of computer-executable instructions, such as program modules, being executed by a computer. Generally, program modules include routines, programs, objects, components, data structures, etc., that perform particular tasks or implement particular abstract data types. Moreover, those skilled in the art will appreciate that the invention may be practiced with a variety of computer-system configurations, including hand-held devices, multiprocessor systems, microprocessor-based or programmable-consumer electronics, minicomputers, mainframe computers, and the like. Any number of computer-systems and computer networks are acceptable for use with the present invention. The invention may be practiced in distributed-computing environments where tasks are performed by remote-processing devices that are linked through a communications network. In a distributed-computing environment, program modules may be located in both local and remote computer-storage media including memory storage devices. The computer-useable instructions form an interface to allow a computer to react according to a source of input. The instructions cooperate with other code segments to initiate a variety of tasks in response to data received in conjunction with the source of the received data.

Figure 1:
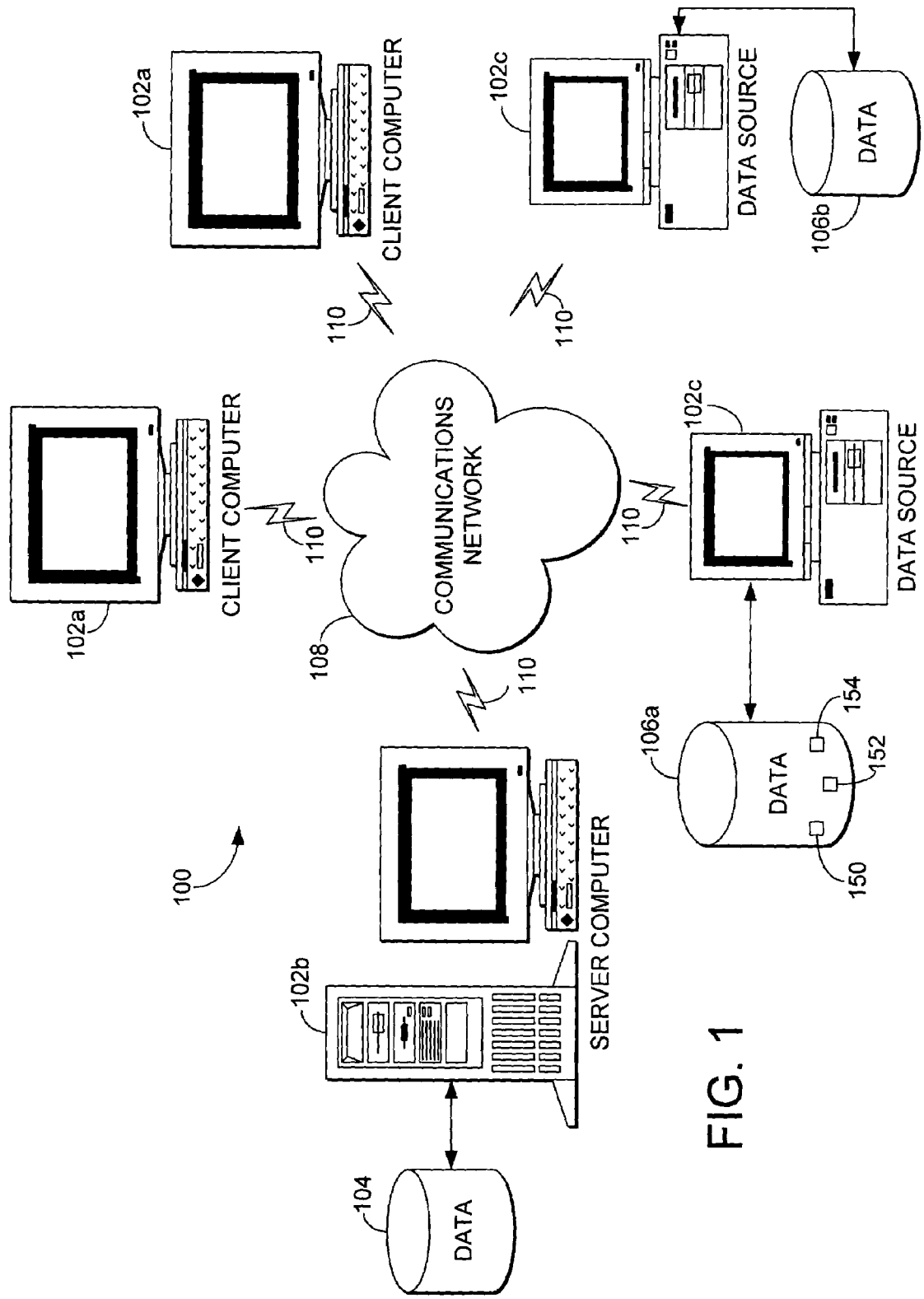
FIG. 1 is a is a schematic diagram representing a network in which aspects of the present invention may be incorporated in accordance with an embodiment of the present invention.

FIG. 1 illustrates an exemplary network environment 100 in which the present invention may be wholly or partially employed. Of course, actual network environments can be arranged in a variety of configurations; however, the exemplary environment shown here provides a framework for understanding the type of environment in which the present invention may operate. The network may include client computers 102a, a server computer 102b, data sources 102c, and data stores 104, 106a, and 106b. The client computers 102a and the data source computers 102c are in electronic communication with the server computer 102b via communications network 108, e.g., an Intranet or the Internet. Client computers 102a, server computer 102b, and data sources 102c are connected to the communications network by way of communications interfaces 110. Communications interfaces 110 can be any one of the well-known communications interfaces such as Ethernet connections, modem connections, and so on.

In the example of FIG. 1, a variety of data stores 104, 106a, and 106b provide data or digitized information to the network 100, and the data stores 104, 106a, and 106b may be any number of devices that have the ability to store data. Content within the data stores 104, 106a, and 106b may be communicated to a client computer 102a via communications network 108, which may be a LAN, WAN, Intranet, Internet, or the like. The data sources 102c may store data locally in data stores 106a and 106b. For example, data store 106a has data stored in storage locations 150, 152, and 154. The data provided by data sources 102c may also be stored in the data store 104 maintained by server 102b. Client computers 102a that desire to access the data stored by server computer 102b can interact with server computer 102b to obtain such access. As will be understood by those skilled in the art, a variety of network and data security controls may be provided within network 100 to control the dissemination of data from the various data stores.

Figure 2:
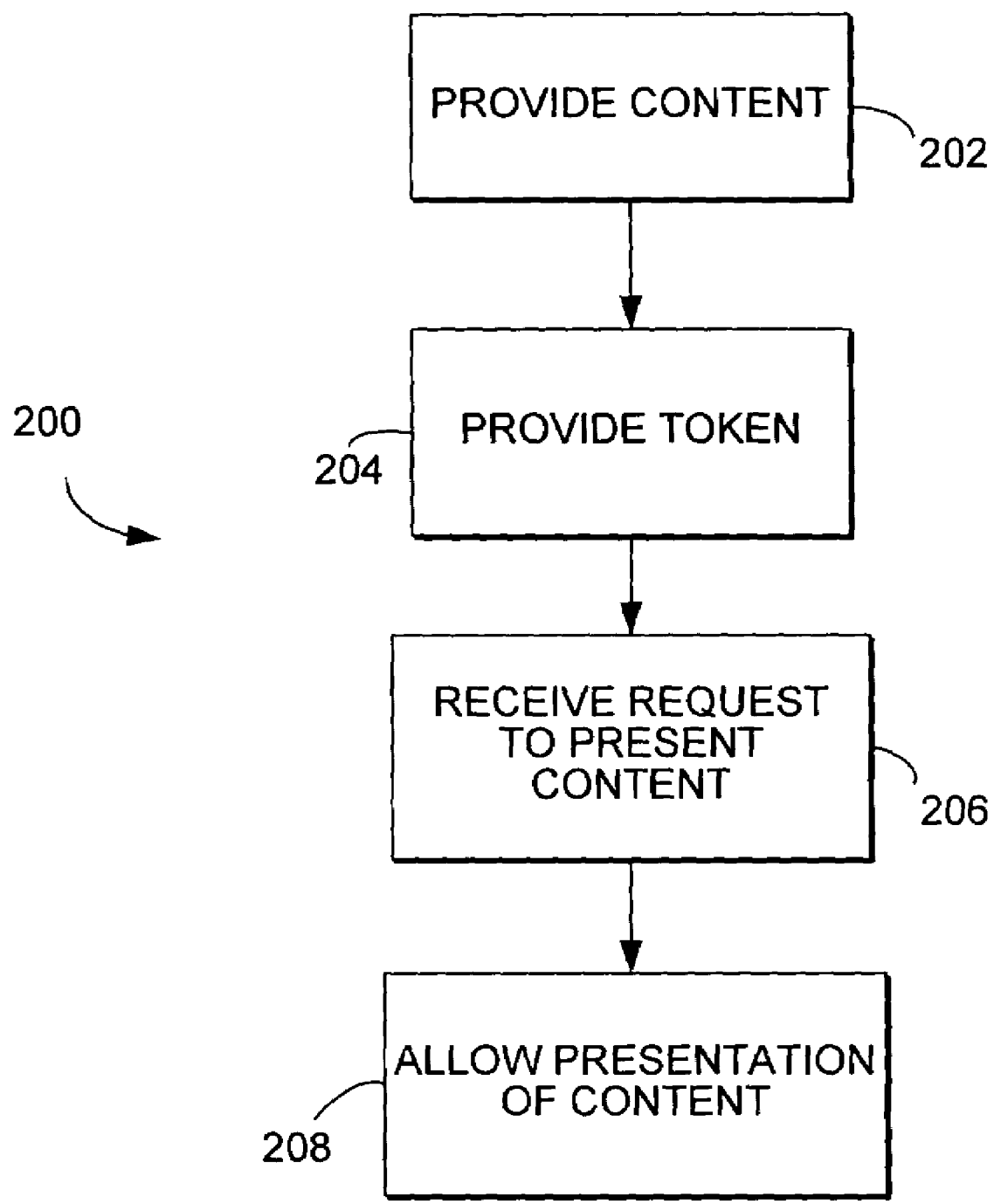
FIG. 2 is a flow diagram showing a method for distributing content in accordance with an embodiment of the present invention.

As previously mentioned, the current invention relates to systems and methods for distributing digital content. FIG. 2 provides a method 200 for implementing an embodiment of the present invention. At 202, a set of digital content is provided. Any information that may be stored digitally is appropriate for inclusion in the set of digital content, and the method 200 may be implemented to manage rights to any digital work. For example, audio, video, image and text files may comprise the set of digitized information. It should be noted that the set of content may be changed periodically. New or updated content may be added to the set, or material may be removed. As the present invention controls distribution of content, those skilled in the art will recognize that the method 200 may be utilized as part of an e-commerce platform or a digital rights management ("DRM") scheme. As such, any content that is distributed or managed by today's e-commerce or DRM systems is appropriate for inclusion in the set of digital content.

The set of content is stored in a location that is accessible over a computer network, such as an Intranet or the Internet. A variety of systems that store information accessible over a network are well known in the art, and any number of these systems are appropriate for use with the present invention. According to one such system, content is placed on a secure server that manages the storage and access to the content.

At 204, one or more physical tokens are distributed. A token may be any device capable of storing information. For example, a token may be a smartcard, a radio frequency identification ("RFID") tag, a USB dongle or other memory media. Such devices are well known in the art, and skilled artisans will recognize that any number of physical objects may be used to store information. Also, tokens may be incorporated into a variety of goods or devices.

The tokens should contain data related to accessing the set of digital content. The data may include a link or reference to the content and to its storage location on the network. According to one embodiment of the present invention, the system utilizes a standardized method to describe the network location of the content. As one example, the token may include a URL that identifies the Internet address that hosts the set of content.

The tokens may also include data or information used to identify the token or to determine whether the token is authentic. As a token may be considered a "key" to accessing the content, the token data may include information that allows a content distributor to determine whether access should be granted. For example, a token may store licensing information, or it may include an identifier that uniquely identifies the token. A content provider can utilize this information to grant access to the token and/or to track the token. It may be desirable that the token data be stored such that it cannot be changed or appended. However, certain embodiments of the present invention may allow additional or altered data to be stored on a token. Those skilled in the art will recognize that data security and encryption techniques may be implemented to protect the token data from tampering or from being illicitly copied. Further, multiple licenses and links may be stored on a single token.

At 206, a request to present content is received over the network from a remote location. According to one embodiment of the present invention, a device capable of reading data from the token resides at the remote location. The token reader device may vary depending upon the type of token utilized, and any device capable of interfacing with a token's data may be acceptable for use with the present invention. In one embodiment of the present invention, the token reader interfaces with an application host that also resides at the remote location. The application host is configured to utilize the token data to formulate the request to access content over the network. The application host relays the data from the token to a secure server and may insert or alter the data when transmitting the request. Further the application host may evaluate the data from a token itself to determine whether content access is proper.

The request is transmitted over the network to a device, such as a secure server, which is configured to receive and evaluate the request. Those skilled in the art will recognize that a variety of techniques presently exist in the art to authenticate such requests and to securely allow access to content. Any number of these techniques may be acceptable for use with the present invention. For example, the secure server may receive a request that includes encrypted license data and a link to a piece of content. The server will decrypt the license data and test it for validity. If the validity test passes, the server allows access to the content.

Once it is determined that the request should be granted, at 208, the method 200 allows at least a portion of the content to be presented at the remote location. Any number of devices may exist at the remote location to present the content. For example, if the requested content is an audio song file, a music playback device will play the requested song. Those skilled in the art will recognize that, depending upon the types of content being requested, any number of presentation devices are acceptable for use with the present invention.

Figure 3:
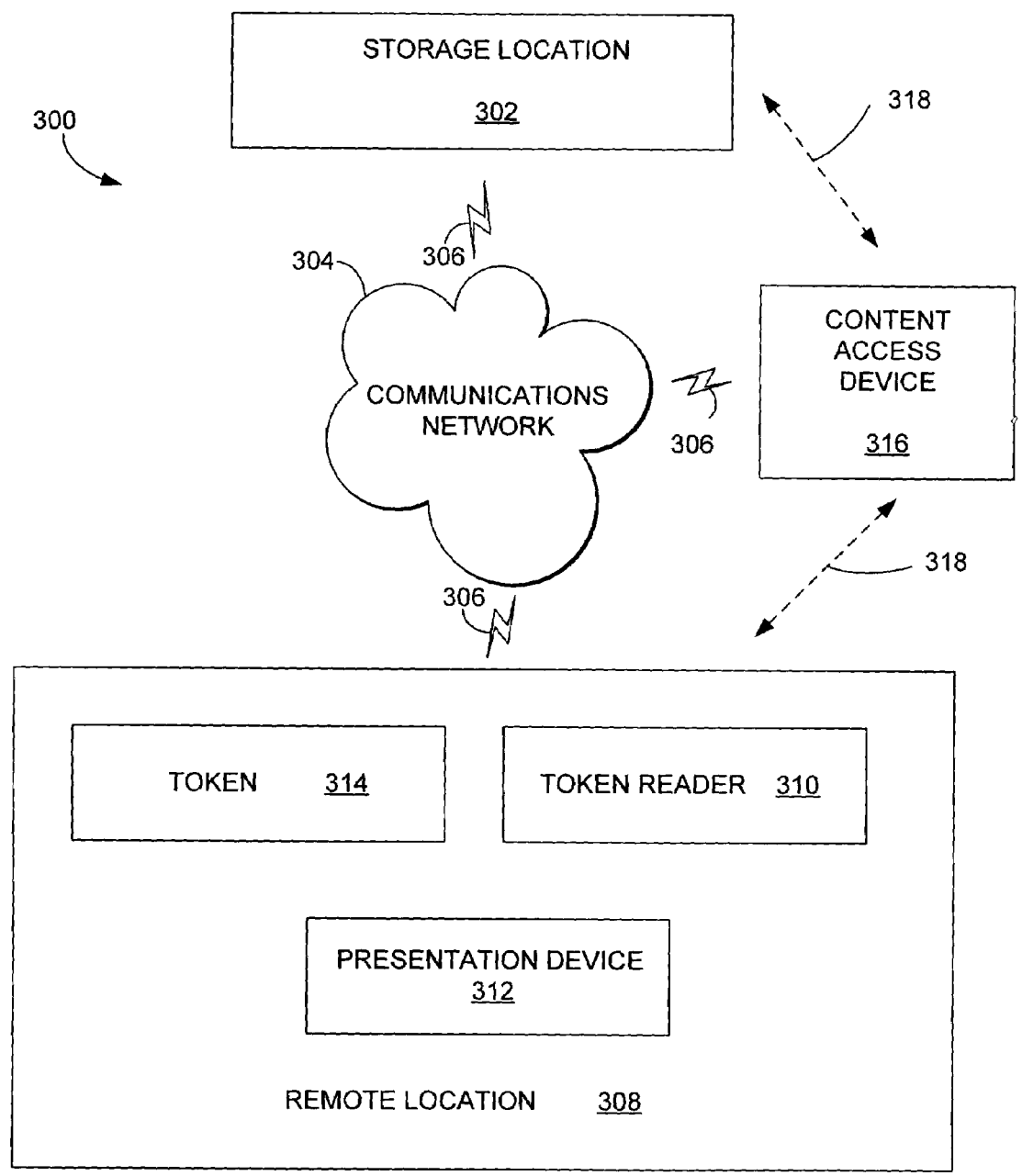
FIG. 3 is a schematic diagram representing a network for distributing digital content over a computer network in accordance with an embodiment of the present invention.

FIG. 3 presents a system 300 for distributing digital content over a computer network in accordance with the present invention. The system 300 includes a storage location 302 that is in communication with a communications network 304 via interface 306. The storage location 302 may be any device capable of storing digital information and communicating with a computer network. The communication network 304 may be the Internet, an Intranet or other computer network. The storage location houses a set of digital content. As previously discussed, the set of digital content may include a variety of media or content that a distributor desires to disseminate.

The system 300 also includes one or more devices located at a remote location 308. These devices may be integrated or networked, and the remote devices may be in communication with communications network 304 via interface 306. The devices include a token reader 310 and a presentation device 312. Optionally, the remote location 308 may include an application host capable of communicating data between the various devices and the network 304.

The remote location 308 also includes at least one physical token 314 that stores data related to the set of content. For example, the data may include a reference to the content's location on the network or may include a license to the content. As previously discussed, the token 314 may take a variety of physical forms, and the token data preferably includes information that allows a content distributor to determine whether content access should be granted to the token 314.

The token reader device 310 is configured to extract at least a portion of the data from the physical token 314. The token reader device 310 may vary depending upon the type of token 314 utilized. For example, if the token 314 is a smartcard, the token reader device 310 may be designed such that the token 314 must be inserted into the reader 310. If the token 314 utilizes radio frequency identification, the token reader device 310 may include an RFID reader which detects the presence of a token 314 and reads its data. As those skilled in the art will recognize, any device capable of interfacing with the data on the token 314 may be acceptable for use with the present invention.

The system 300 further includes a content access device 316. The content access device 316 may optionally be in direct communication via interface 318 with the storage location 302 or with the remote location 308. Further, the content access device 316 may be in communication with communications network 304 via interface 306. The content access device preferably is configured to receive at least a portion of the data from the token 314. After receiving this data, the content access device 316 is capable of determining whether the set of content should be presented at the remote location 308. If appropriate, the content access device 316 allows content to be presented at the remote location 308. As those skilled in the art will recognize, a variety of techniques presently exist in the art to authenticate requests to access content and/or to control content access.

When the content access device 316 allows access to content, the presentation device 312 is permitted to access or to present the desired content. Any number of devices may exist at the remote location 308 to present the content. For example, if the requested content is a video file, a video playback device will play the requested video. Those skilled in the art will recognize that, depending upon the type of content being requested, any number of devices are acceptable for use with the present invention.

Figure 4:
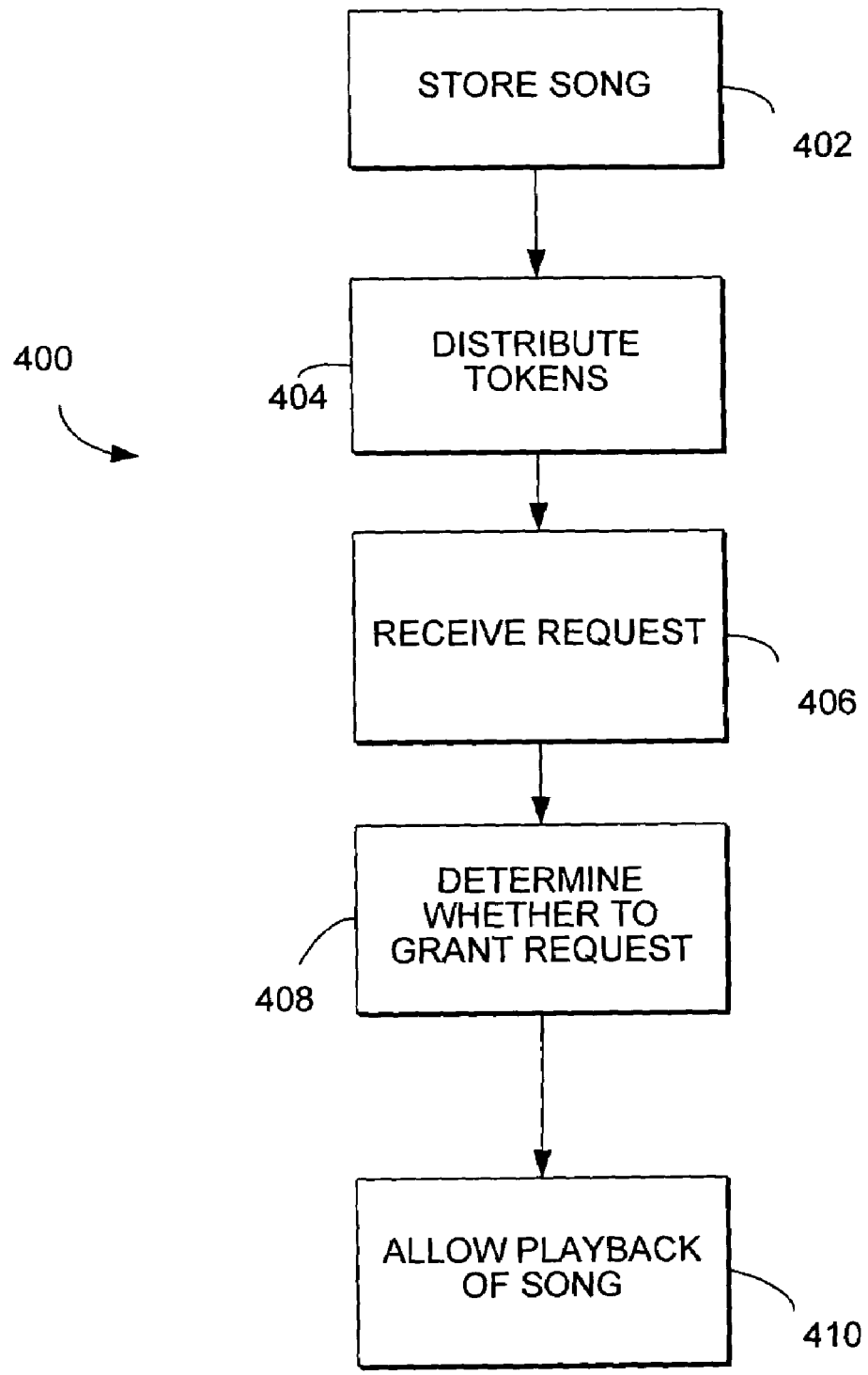
FIG. 4 is a flow diagram showing a method for distributing a song in accordance with an embodiment of the present invention.

FIG. 4 provides an exemplary embodiment of the present invention in which a method 400 distributes a song or other audio file. At 402, a music publisher stores a digital copy of the song on a network server. The network server includes the ability to dictate policies that restrict access to the song.

At 402, the publisher distributes tokens to consumers. As previously discussed, a token is an object which stores information that may be utilized to access content. For example, the token may be a smartcard upon which an encrypted digital license is stored. The token may also include a link to the network location where the song is stored.

The token may be distributed via a variety of methods and through a variety of channels of commerce. For instance, the token may be sold at a music store or at a concert. A token may be inserted into a magazine or a direct mailer. Also, a token may be incorporated with goods. For example, a token may be incorporated into a concert ticket. In this case, the ticket could provide both the means to enter an artist's concert and to access the artist's song over the network.

At 406, the secure server receives a request to allow access to the song. According to one embodiment of the present invention, the request is received after a token reader obtains encrypted license data from the token. This data is communicated to the secure server as part of the request to access the content.

At 408, the method 400 determines whether to allow access to the song. Any number of techniques exist in the art for evaluating requests to access information over a network. The server may decrypt the license data and test it for validity and authenticity. If the server determines that access to the content is appropriate, at 410 access to the song is allowed and a music playback device begins to play the song.

Figure 5:
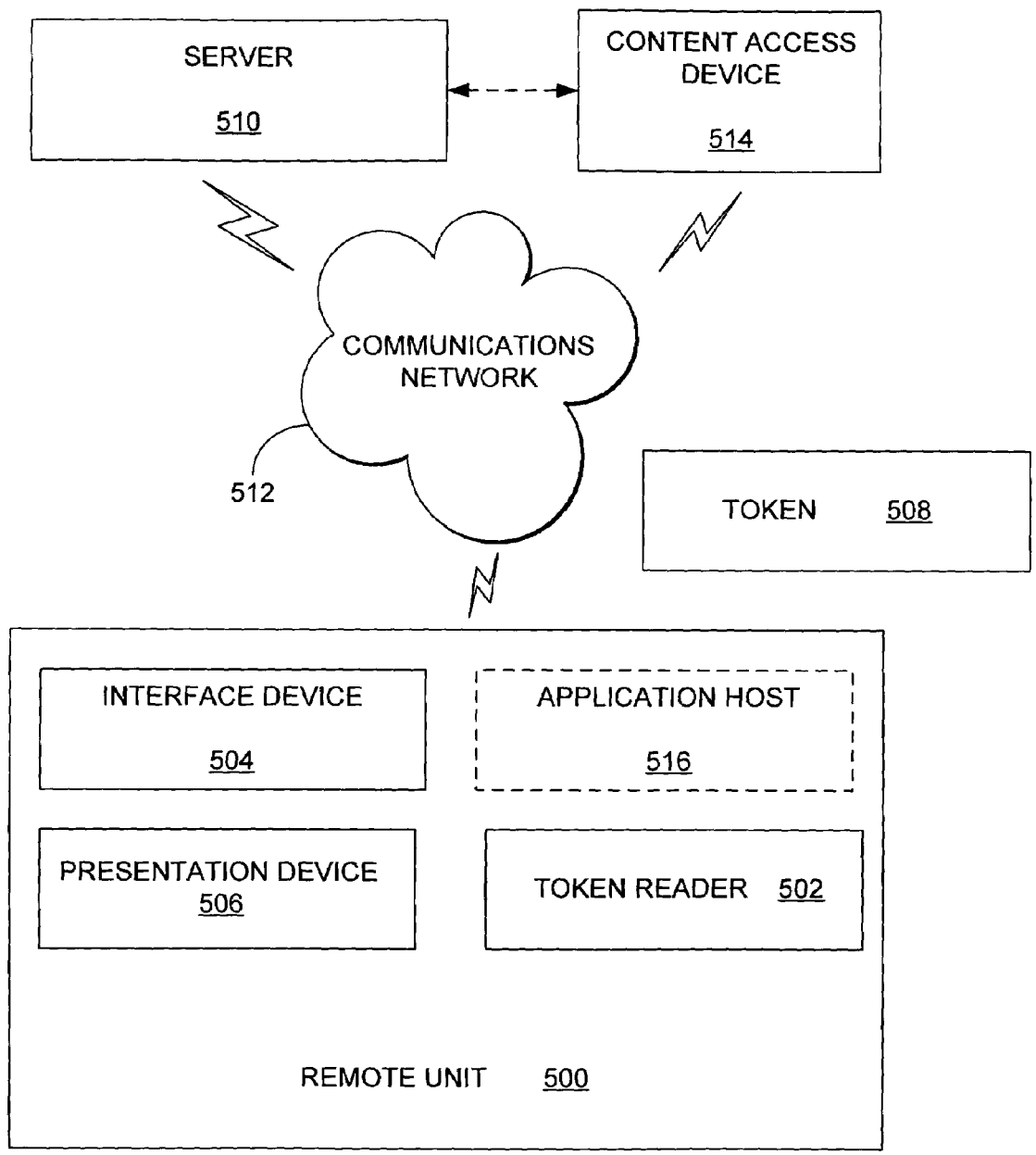
FIG. 5 is a schematic diagram representing a remote unit for obtaining access to digital content in accordance with an embodiment of the present invention.

FIG. 5 illustrates a remote unit 500 for obtaining access to digital content in accordance with the present invention. The remote unit 500 is made up of various devices, and those skilled in the art will recognize that remote unit 500 may include additional devices than described herein. Those skilled in the art will further recognize that the devices of remote unit 500 need not be physically placed together and that the devices may be integrated or networked.

The remote unit 500 includes a token reader 502, an interface device 504, and at least one presentation device 506. As previously discussed, the systems of the present invention utilize physical objects called tokens 508. The tokens 508 contain data related to accessing content, and this data may include licensing data or data indicating the location of a piece of content. Each of the tokens 508 represents one or more pieces of content stored on a server 510. The content associated with a token may be customized, and a customer may select the associated content. A token may be encoded with licensing information for the customized set of content, or a server may maintain a listing of content associated with a token.

The token reader 502 is configured to obtain the data from the tokens 508. Depending on the type of token utilized, the token reader 502 may read tokens within a given proximity to the reader 502, or a customer may have to physically place one of the tokens 508 into the reader 502. According to some embodiments of the present invention, the token reader 504 may be configured to add or to alter data on the tokens 508. Depending on the system's policies, the remote unit 500 may require that one of the tokens 508 remain within or near by the token reader 502 while content is being accessed.

Once the token reader 502 had obtained data from one of the tokens 508, the interface device 504 is configured to transmit a request to access the content associated with the token 508. Preferably, the request includes at least a portion of the token's data. The request is transmitted over communication network 512 to either a content access device 514 or to a server 510. The content access device 514 contains policies for determining whether a request should be granted. The content access device 514 and/or the server 510 evaluate the request, and, if appropriate, grant the interface device 504 access to the requested content.

Once access is granted the presentation device 506 may present the content as desired. Of course, different types of content will require different types of presentation devices, and the remote unit 500 may include a variety of presentation devices 506. Further, different digital media can be mixed, combined, or scripted to create a multi-media presentation. For example, a token promoting a particular artist may contain licenses and links to images, videos, songs, and text for that artist. The token may also contain a license or link to a script for orchestrating a multi-media presentation. When inserted into reader 502, the data on the token might enable the remote unit 500 to synchronize the presentation of still images on digital picture frames, videos on digital monitor screens, audio on digital receivers and speakers, and text information on digital reading devices.

Optionally, the remote unit 500 has an application host 516 that manages interactions and communications between the various devices, the network 512, and a user. The application host 516 may include a graphical user interface that provides information and controls pertaining to content access and content presentation. The remote device 500 may also include local storage memory that can store or cache a copy of the content. According to one embodiment of the present invention, even when content is stored locally, a token is required to present the content.

The remote unit 500 may also have the ability to block presentation of certain content. As many televisions today have devices that prohibit presentation of violent or adult-oriented programming, the remote unit 500 may similarly detect and block inappropriate content. In fact, distribution of the tokens may also facilitate the control of inappropriate content. For instance, children under a certain age may not be permitted to purchase tokens associated with unsuitable content.

Figure 6:
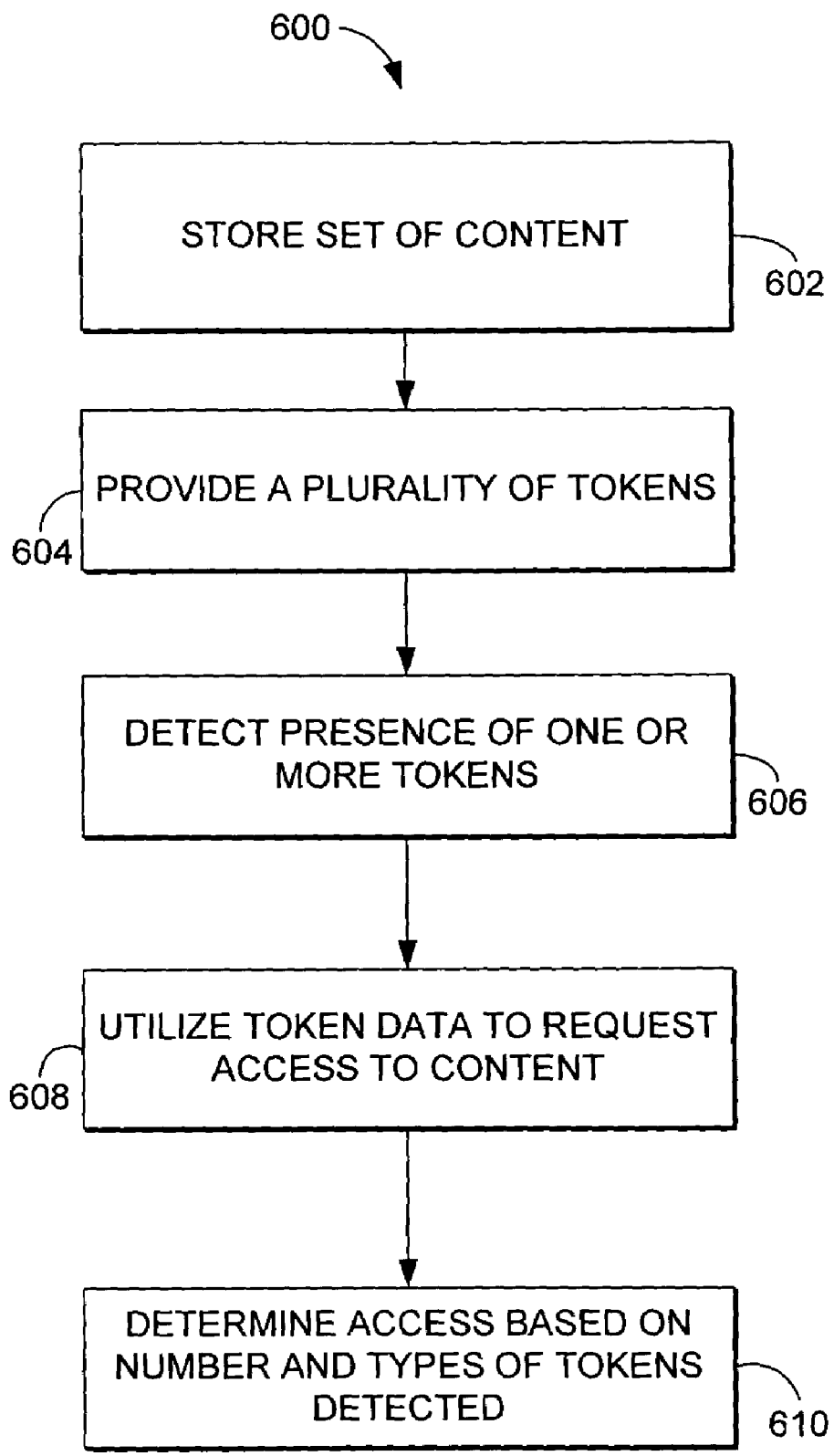
FIG. 6 is a flow diagram showing a method for distributing content in accordance with an embodiment of the present invention.

FIG. 6 provides a method 600 for distributing content in accordance with the present invention. At 602, a set of content is stored on a secure server on a network or on a device otherwise in communication with a token reader and/or presentation device. At 604 a content provider distributes tokens to consumers. As previously discussed, a token is a physical object that may be used to gain access to a piece of digital content. Because the licenses stored on a token need not be tied to a person, tokens and their associated licenses may be transferred freely. Hence, content distributors may encourage their customers to trade and collect different tokens. However, other scenarios may dictate that a token's license be tied to a particular user. In these user-based license scenarios, a user may have to present both the token and a password to access content.

At 606, the method 600 detects the presence of one or more tokens, and, at 608, the method determines access rights depending upon the type and number of tokens detected. For example, multiple tokens (i.e., two or more tokens) may be detected at a remote location. When data is read from these tokens and sent to a server, additional content may be made available at the remote location. For example, to encourage collecting of tokens, a content publisher may provide bonus or premium content when multiple tokens (i.e., two or more tokens) or a set of tokens is detected. Further, combinations of different types of tokens also may yield access to additional content. For instance, presenting tokens related to two different recording artists might enable access to a duet by the artists.

Those skilled in the art will recognize that the current invention will provide many opportunities for cross-selling of services and goods, as well a provide means for targeted distribution of promotional content to consumers. For example, a token may be associated with a particular recording artist. If this token is detected at a dance club, music by the artist may be played at the club. As another example, a t-shirt promoting a newly released movie may have an embedded token. A restaurant also promoting this movie may detect the token and offer its wearer a discounted meal.

Figure 7:
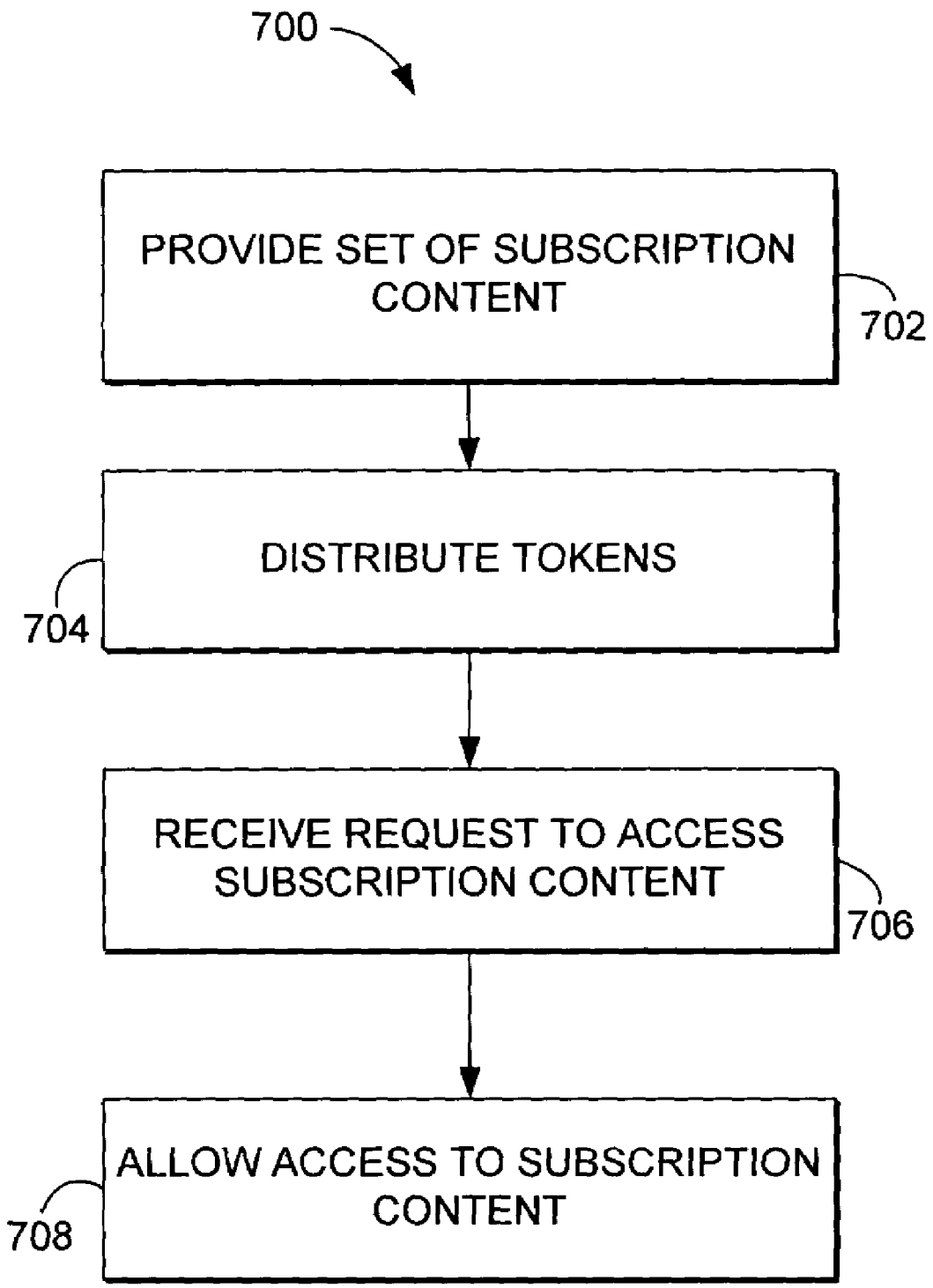
FIG. 7 is a flow diagram showing a method for distributing content in accordance with an embodiment of the present invention.

FIG. 7 provides a method 700 for distributing subscription content in accordance with the present invention. At 702 a set of subscription content is provided. As previously discussed the present invention provides methods for distribution of content, and this content may change periodically. According to one embodiment, a content publisher provides changing content as part of a subscription-based content service. For example, an online magazine may make articles available on a computer network. From time to time new articles may be posted, while older articles may be updated or removed. Those skilled in the art will appreciate that the current invention may be utilized to distribute both dynamic and static content.

At 704, the method 700 distributes tokens. The tokens store data associated with accessing the subscription content, and a token may be utilized to gain access to content. The token may provide data that restricts the duration of time that it may be utilized to gain access to the content. As many subscription-based content services are purchased for a set period of time, the token may enforce the expiration of a subscription. The token may stop working after the subscription expires or the token may be re-activated by the content publisher. Such time-based restrictions may also be well suited for trial memberships or trial access to content.

Those skilled in the art will recognize the advantages of having a physical token that represents the subscription content. For instance, a token is freely transferable and may be easily presented as a gift. Also, a token may be combined, for example, with a museum membership card. Content corresponding with exhibits at the museum may be made available over the computer network. In this system, museum members may use the membership card to both enter the museum and to access on-line content.

At 706, the content provider receives a request to access the subscription content. As previously explained, the request contains data from one or more token detected at a remote location. If the request is proper, access is allowed to the subscription content at 708.

Alternative embodiments and implementations of the present invention will become apparent to those skilled in the art to which it pertains upon review of the specification, including the drawing figures. Accordingly, the scope of the present invention is defined by the appended claims rather than the foregoing description.

The invention claimed is:

1. A computer-implemented method for distributing digital content over a computer network, the method comprising:
   providing a set of digital content in a storage location accessible by one or more computers connected to a computer network;
   providing multiple physical tokens that store data related to access rights to a portion of said set of digital content, wherein said multiple physical tokens includes a first token storing data for accessing a first set of digital content, and wherein said multiple physical tokens includes a second token storing data for accessing a second set of digital content;
   detecting at least two of said multiple physical tokens within a predetermined proximity to a token reading device residing at a remote location, wherein the detected physical tokens are not in physical contact with said token reading device;
   in response to said detecting, generating a request for at least a portion of said set of digital content to be presented at said remote location, wherein the request is transmitted over said computer network from said remote location; and
   in response to said request, utilizing said data from at least said first token and said second token to select a third set of digital content for presentation at the remote location, wherein said third set of content is made accessible for presentation in response to detection of said first token and said second token at said remote location.

2. The computer-implemented method of claim 1, further comprising adding content to or removing content from said set of digital content.

3. The computer-implemented method of claim 1, wherein said set of content is related to a subscription-based content service.

4. The computer-implemented method of claim 1, wherein said physical token is a smartcard.

5. The computer-implemented method of claim 1, wherein said physical token utilizes radio-frequency identification.

6. The computer-implemented method of claim 1, wherein said data includes authentication information.

7. The computer-implemented method of claim 1, further comprising utilizing at least a portion of said data associated with accessing said set of digital content to determine whether said request should be granted.

8. The computer-implemented method of claim 1, further comprising detecting the presence of said multiple tokens at said remote location and transmitting said request over said network.

9. The computer-implemented method of claim 1, wherein said request includes data from a plurality of said tokens.

10. The computer-implemented method of claim 1, wherein allowing presentation of at least a portion of said set of digital content includes selecting said portion of content allowable for presentation based on the number or type of tokens residing at said remote location.

11. A computer system for distributing digital content over a computer network, the system comprising:
   a set of digital content residing in a storage location accessible by one or more computers connected to a computer network;
   two or more physical tokens that store data related to access rights to a portion of said set of digital content, wherein said two or more physical tokens includes a first token storing data for accessing a first set of digital content, and wherein said two or more physical tokens includes a second token storing data for accessing a second set of digital content;
   a token reader device configured to read said data from multiple of said two or more physical tokens detected at a remote location;
   a presentation device capable of rending at least a portion of said set of digital content; and
   a content access device capable of utilizing said data from at least said first token and said second token to select a third set of digital content for presentation at the remote location, wherein said third set of content is made accessible for presentation in response to detection of said first token and said second token at said remote location.

12. The computer system of claim 11, further comprising an application host residing at a remote location, wherein said application host is configured to communicate said data from said remote location to said content access device.

13. The computer system of claim 12, wherein said application host is configured to access at least a portion of said set of digital content over said network when said content access device permits presentation of at least a portion of said set of digital content.

14. The computer system of claim 11, wherein said set of content is periodically altered.

15. The computer system of claim 11, wherein said set of content includes at least one of audio, video or image content.

16. The computer system of claim 11, wherein said data related to said set of digital content includes licensing information.

17. A computer system for managing access to digital content, the system comprising:
- two or more physical tokens that store data related to access rights to one or more pieces of digital content and that store one or more content identifiers which identify at least a portion of said one or more pieces of digital content, wherein said one or more pieces of digital content are stored on a storage device accessible by one or more computers, wherein said two or more physical tokens includes a first token storing data for accessing a first set of digital content, and wherein said two or more physical tokens includes a second token storing data for accessing a second set of digital content;
- a token reader device configured to read said data from at least said first token and said second token detected at a remote location and to utilize said data from said first token and said second token to create a request for a third set of digital content to be presented at the remote location, wherein said third set of content is made accessible for presentation in response to detection of said first token and said second token at said remote location;
- an interface device capable of transmitting said request and capable of accessing at least a portion of said pieces of digital content when said request is granted; and
- a presentation device capable of rending at least a portion of said one or more pieces of digital content when said request is granted.

18. The computer system of claim 17, wherein said data related to said set of digital content includes an indicia that identifies each of said two or more physical tokens.

19. The computer system of claim 17, wherein said data related to said set of digital content restricts the duration of time which said two or more physical tokens may be utilized to gain access to said set of digital content.

20. The computer system of claim 17, wherein said token reader device utilizes radio frequency identification.

* * * * *